INVENTORS.
HENRY F. HEIN
ROGER W. PATTERSON
BY
John W. Husser
Robert W. Hampton
ATTORNEYS

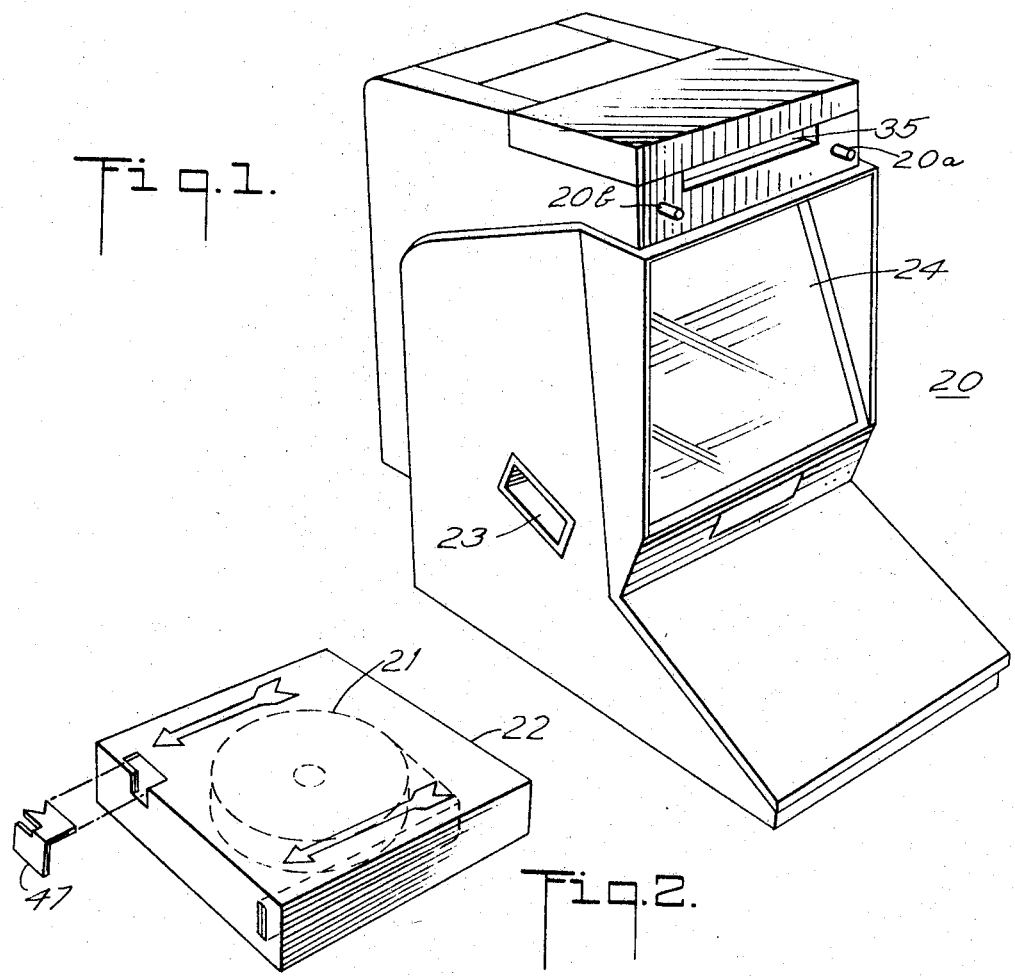
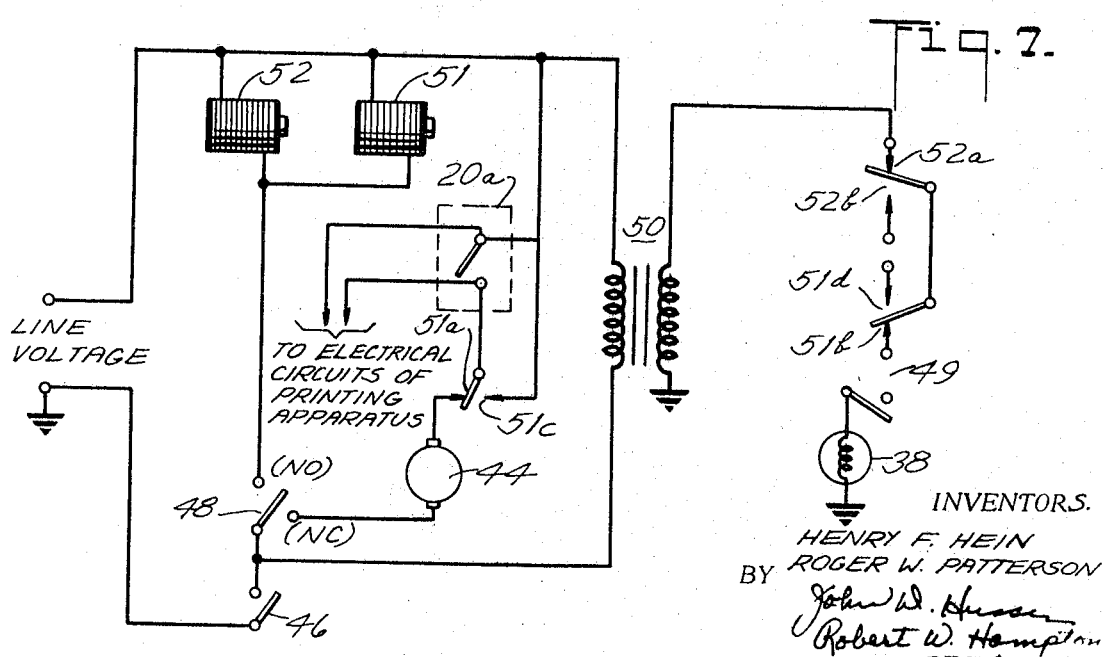

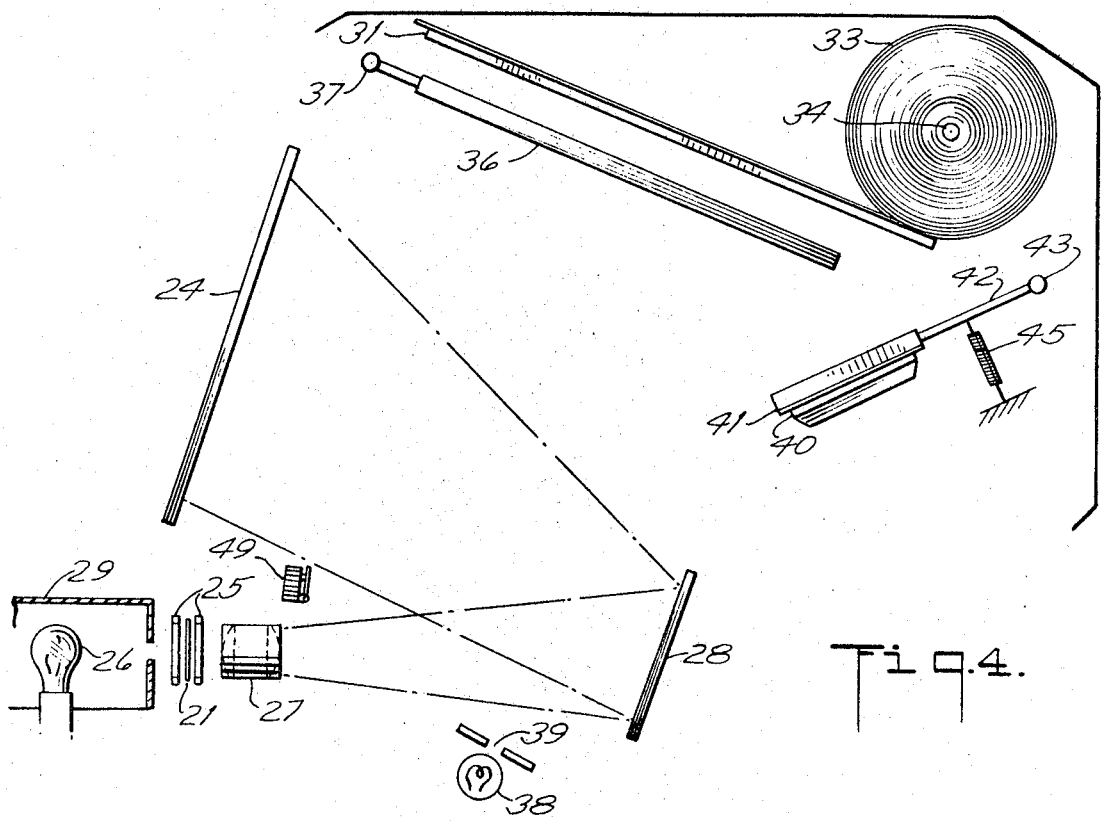
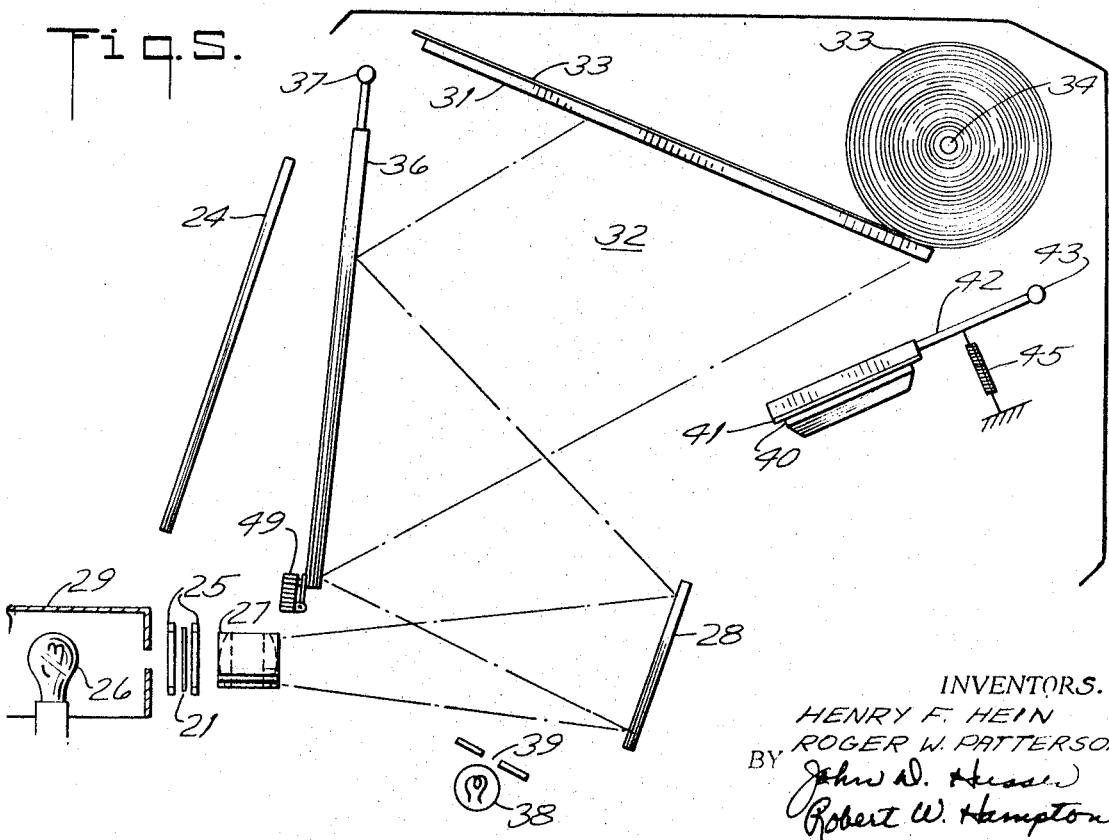

United States Patent Office 3,515,477
Patented June 2, 1970

3,515,477
PHOTOGRAPHIC PROJECTION PRINTING
APPARATUS
Henry F. Hein, North Bellmore, N.Y., and Roger W. Patterson, Hillsdale, N.J., assignors to Eastman Kodak Company, Rochester, N.Y., a corporation of New Jersey
Filed Sept. 6, 1967, Ser. No. 665,925
Int. Cl. G03b 27/70
U.S. Cl. 355—42              18 Claims

ABSTRACT OF THE DISCLOSURE

A microfilm reader-printer machine makes two projection prints of the same film. The first print has an optically superimposed legend thereon bearing information supplementing the information on the film. The machine includes a projectable, image-bearing legend stored on a motor driven frame. A print switch turns on the motor, moving the legend into its print position. An auxiliary light source projects an image carried by the legend through a neutral density filter to form a latent image on a print in the reader-printer exposure station. At the same time, another light source is directed through the film and is projected to expose a portion of the film image on the print. A relay circuit then turns off the frame driving motor so the frame can return to its stored position, turns off the auxiliary light source and initiates a second film printing cycle to make a second print of the same film.

BACKGROUND OF THE INVENTION

The invention relates to machines that include apparatus for making prints from light directed through a film negative.

An example of a machine of this kind is the conventional microfilm reader-printer machine in which an image projected from the film is reflected from a stationary mirror to a viewing screen. When a print of the projected image is desired, a rotatable mirror is moved to a position at which it intercepts the light reflected from the stationary mirror and directs it along a folded path to a print exposure area. A photosensitive sheet of printing paper located at the exposure area is thereby exposed for a predetermined time and then moved to a developing station. The developed print is then ejected from the machine.

For record-keeping purposes, for example, to determine the quantity and destination of prints made from a selected roll of microfilm, it is sometimes necessary to add supplementary information to the developed print. Conventional reader-printer machines are not adapted to incorporate this supplemental information on the print by optical means, primarily because the complex optical-printing apparatus therein is not readily modifiable to incorporate apparatus for adding the desired supplemental information to a print of the microfilm image. Consequently, when the supplemental information is required, it must be added to the print after the print is made.

SUMMARY OF INVENTION

It is an object of the present invention to provide apparatus for optically superimposing a supplemental information image on a print image made from light directed through a film negative.

It is a further object of the invention to provide a microfilm printing machine which has a mode of cyclic operation whereby multiple prints of a microfilm image are produced and in which one or more of such prints has an optically superimposed legend thereon.

It is another object of the invention to provide, in a microfilm reader-printer machine, apparatus for optically superimposing supplemental information on a print made from a microfilm image.

Yet another object of the invention is to provide a microfilm reader-printer having mechanism for forming an image of supplemental information superimposed on a print of the microfilm, the superimposed image being exposed on the print material during exposure of microfilm image.

Still another object of the invention is to provide a microfilm reader-printer machine adapted to make two consecutive prints of the same microfilm image, one of which prints has a supplemental information bearing legend optically superimposed thereon.

Other objects and a fuller understanding of the invention are had by referring to the description of the embodiment and the claims, taken in conjunction with the drawings.

Briefly, in accordance with one aspect of the present invention, the foregoing and other objects are accomplished by providing in a reader-printer apparatus of the type having a film image projection system, a viewing screen, an exposure station for photosensitive print material and a means for selectively operating the apparatus for either viewing the film image or projecting the image onto the print exposure station, a means responsive to the operation of said apparatus in its print exposing mode, for optically superimposing a supplemental information image into a portion of the film image projected at the exposure station. In addition, the improved reader-printer apparatus of the present invention includes a selectively operative, electro-mechanical system which provides cyclic control of the print-out operation of the reader so that a plurality of prints are automatically exposed from the same film negative, with at least one of the prints having superimposed supplemental information.

DESCRIPTION OF DRAWINGS

In the drawings:

FIG. 1 is a perspective view of a microfilm reader-printer machine;

FIG. 2 is a perspective view of a microfilm magazine;

FIG. 3 is a front view of a portion of the interior of the reader-printer apparatus, the view being taken along line 3—3 in FIG. 1;

FIGS. 4, 5 and 6 are side elevation views of a portion of the machine apparatus for exposing prints; and FIG. 7 is a simplified schematic showing a portion of the electrical and the electromechanical apparatus incorporated in the reader-printer machine.

DESCRIPTION OF THE EMBODIMENT

Figure 5:
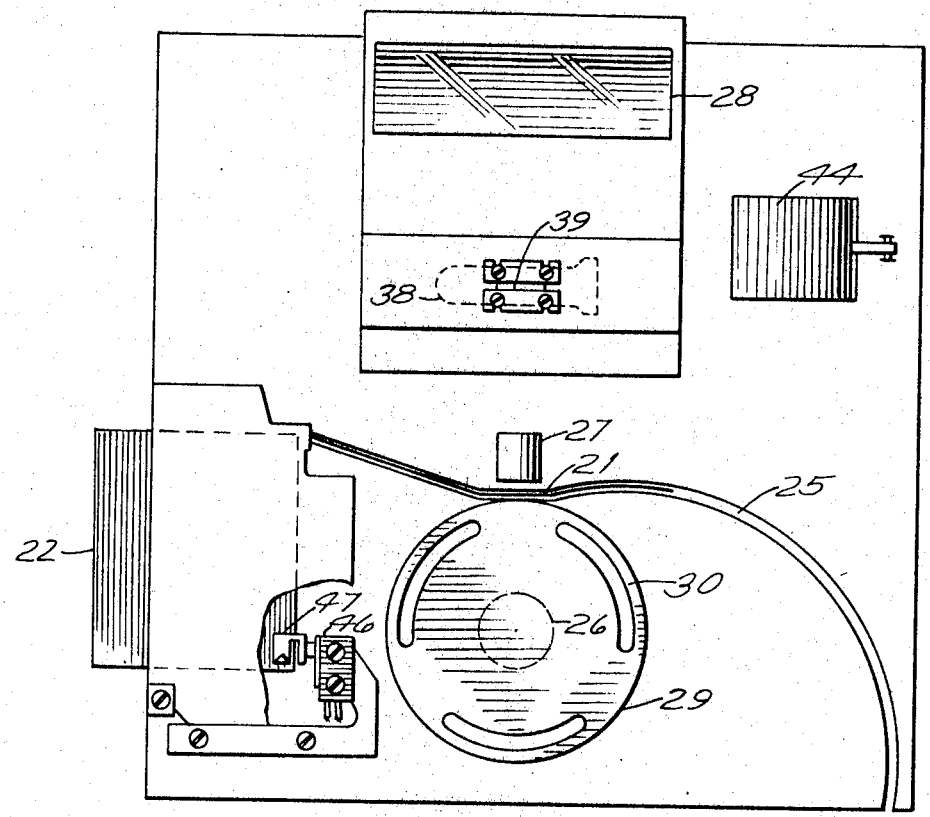

One kind of machine that includes apparatus for making a print from light directed through a film negative is the microfilm reader-printer machine 20 (FIG. 1).

The microfilm reader-printer machine 20 comprises apparatus for positioning and viewing the microfilm 21 contained in a film magazine 22 (FIG. 2) that is inserted in slot 23 and for selectively projecting images on the microfilm onto photosensitive print material located at the exposure station. The viewing apparatus includes a viewing screen 24.

The microfilm can be manually or automatically supplied from a reel in magazine 22 to a film track 25 (see FIG. 3). It is advanced along the track 25 past a projection station in which includes a light source 26 (FIGS. 4-6), a magnifying lens 27. The film is advanced between the light source 26 and the lens 27 that collects the light directed through the film to project a magnified image thereof on the stationary mirror 28. When the reader printer is operated in the viewing mode, the mirror 28 reflects the light onto screen 24. The light source 26 is enclosed by a housing 29, that has a plurality of vents 30 for convection cooling.

The machine 20 also includes apparatus for making a print from the light directed through the microfilm. The print making apparatus includes a printer glass 31 having a print exposure area indicated generally at 32, and means for supplying photosensitive paper 33 to the print exposure area. The paper supplying means can include a motor driven shaft 34 periodically rotating to supply paper to the print exposure area and to advance the light exposed paper along the printer glass 31 to conventional print developing means (not shown), which ejects a developed print from the slot 35 (FIG. 1).

Figure 6:
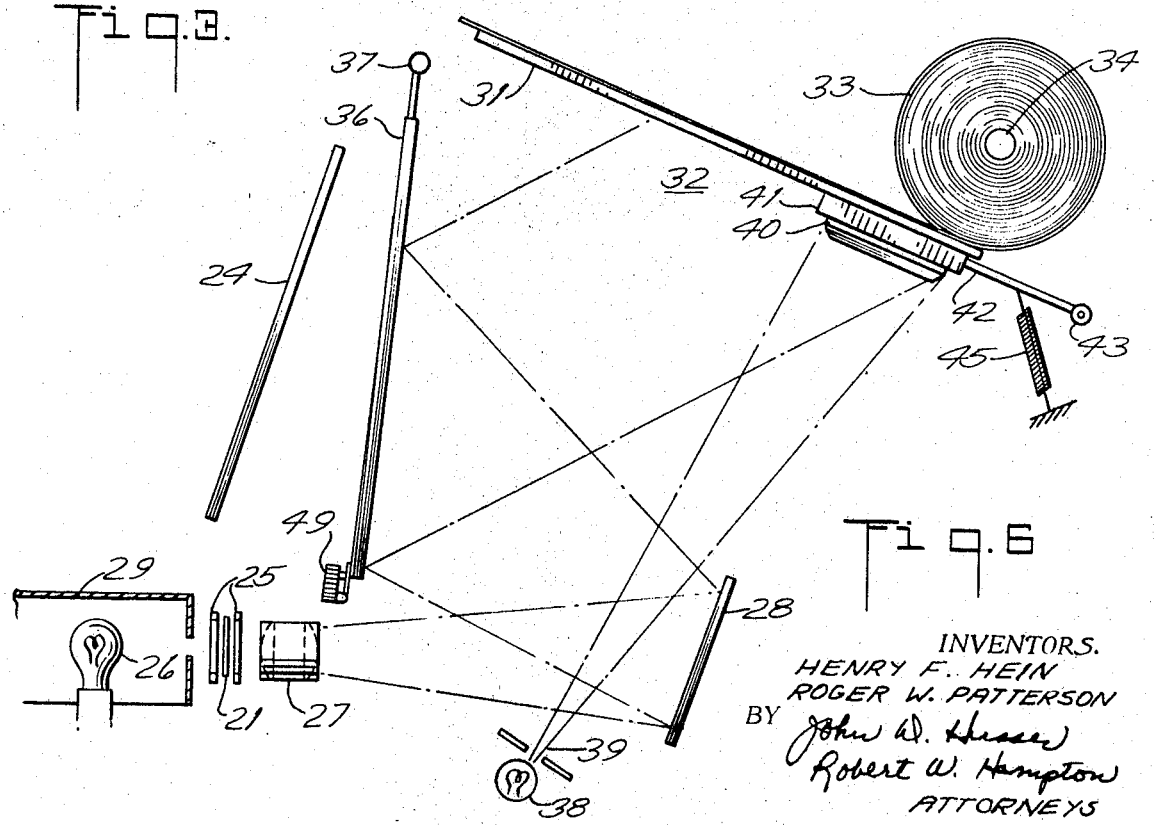

The print making apparatus includes a mirror 36 pivotally mounted in the reader-printer for movement between a storage position (FIG. 4), and a printing position (FIGS. 5 or 6). Means for moving the mirror 36 from one position to the other includes a motor driven shaft 37 connected to the mirror 36. When the reader-printer is operated in its printing mode, the mirror 36 is moved to the printing position and directs a magnified image of the microfilm in the projection station along a folded light path between the stationary mirror 28 and the print exposure area 32.

The reader-printer machine 20 also comprises means for activating the print making apparatus of the reader-printer, including a print switch 20a, which when closed initiates a printing cycle by causing rotation of a driver cam system (not shown), controlling print exposure time and print development time during the printing cycle.

According to the invention, the mirofilm reader-printer machine 20 includes means, responsive to the activation of the print making apparatus, for optically superimposing the image of a projectable information bearing legend onto a portion of the exposure area onto which the film image is directed. The superimposing means can include an auxiliary light source 38 directed through an aperture 39 to a legend film 40 and a neutral density filter 41, in register therewith. Means are provided for moving the filter 41 and the legend 40 from the storage position (FIGS. 4 or 5) to a position intermediate the auxiliary light source 38 and the print exposure area 32 (FIG. 6). This moving means includes a frame 42 linked to the shaft 43 of a motor 44; the frame 42 is fastened to a means, including a spiral spring 45, for returning the filter and the legend to their storage position.

The superimposing means is responsive to the operation of the print making apparatus and a means for enabling the machine 20 consecutively to make two prints of the same viewed microfilm and operates in a manner such that the first of the two prints has an optically superimposed information bearing legend thereon. The enabling means can include a normally open switching element, for example, switch 46 (FIG. 3), that is closed when a tab 47 is located on the film supplying magazine 22 inserted in slot 23 (FIG. 1). The switching element cooperates with the activating means (20a) to energize the superimposing apparatus.

When conventional reader-printer machine 20 operation is desired, no tab 47 is placed on the magazine 22. With the magazine in place in slot 23, the machine operator uses control 20b to turn on the light source 26 to view a magnified image of the film 21 through the viewing screen 24.

The operation of the printing apparatus of the reader-printer when operating in the conventional printing mode is as follows. The print switch 20a is depressed, thereby starting rotation of the driver cam system which controls the normal print cycle of the reader-printer. The cam system turns on the motor that drives shaft 37 so as to move mirror 36 from its storage position to its printing position. As a result, the projected microfilm image is directed along a folded light path from the stationary mirror 28 to the mirror 36, in its printing position, to the print exposure area 32. After a predetermined exposure time, the driver cam system causes a reversal of shaft 37 rotation to return mirror 36 to its storage position. At this time, the driver cam system also throws paper advance switch 48 (FIG. 7) from its normally closed (NC) position to its normally open (NO) position, thereby activating the motor driven shaft 34 to advance the exposed paper to the print developing means. After the developed print is ejected from slot 35, the driver cam system throws switch 48 back to its normally closed position and opens the contacts of the print switch 20a. Microfilm viewing or further film printing can then be effected.

In accordance with the illustrated embodiment of the invention, when microfilm prints bearing optically superimposed legends are desired, magazine 22 is modified to include a tab 47 (FIG. 2). When the modified magazine is in place in slot 23, tab 47 closes the switch 46, thereby enabling the machine 20 consecutively to make two prints of the same viewed microfilm, the first of which has an optically superimposed information bearing legend thereon in a manner hereinafter to be described.

The superimposing means is energized by activation of the print switch 20a and the switch 46. When both switches are actuated, and with switch 48 in its normally closed position, a circuit path between the source of line voltage and motor 44 is closed, thereby energizing the motor to move the frame 42 from its storage position to a position intermediate the auxiliary light source 38 and the print exposure area 32, for example, adjacent to printer glass 31 (FIG. 6). When the frame is so moved, motor 44 stalls, thereby holding the frame adjacent to the printer glass 31. At the same time, the normal cyclic movement of mirror 36 to its printing position closes switch means 49 coupling line voltage from transformer 50 through swtiches 52a and 51b to the auxiliary light source 38. As shown in FIG. 6, the microfilm image projected by light 26 and lens 27 is directed to the print exposure area 32 in accordance with the conventional print-out mode of the reader-printer. However, projection of light from source 26 through the legend 40 is prevented or minimized by filter 41. The auxiliary light source 38 can be of higher intensity than the light 26 so as to pass through the filter 41 and the legend 40, thereby projecting an image of the legend on a portion of the photosensitive paper located in the print exposure area 32.

After the predetermined exposure time, the driver cam system throws the paper advance switch 48 to its normally open position (NO), de-energizing motor 44. Frame 42 is returned to its storage position as a result of the restoring force of spring 45 so that the legend 40 and filter 41 are no longer in the film image projection path.

When switch 48 is thrown to its normally open position, and with switch 46 still closed, relays 51, 52 are energized so as to effect the opening of relay contacts 51a, 51b and 52a, as well as the closing of relay contacts 51c, 51d and 52b, thereby de-energizing the auxiliary light source 38. Relay 51 is a bistable relay, that is, its contacts have first and second stable states. After its relay contacts are switched from the first state to the second state, and the relay 51 armature is de-energized, the contacts remain in that second state until the relay 51 armature is re-energized. Therefore, when the first microfilm print, having an optically superimposed information bearing legend, is ejected from slot 35, and paper advance switch 48 is thrown back to its normally closed position by the driver cam system, the motor 44 and light source 38 remain de-energized, since relay contacts 51c, 51d remain in the stable second state.

At this time, print switch 20a is also opened by the driver cam system; however, the closed contacts 51c of relay 51 comprise a portion of an electrical circuit that simulates a function of the means for activating the print making apparatus thereby initiating the second print making cycle. In effect, closed relay contacts 51c electrically simulate manual activation of print switch 20a. Therefore, a second printing cycle is initiated. Since relay contacts 51c, 51d remain in their second stable state during the second printing cycle, motor 44 and light source 38 remain de-energized during that cycle.

When paper advance switch 48 is thrown to its normally open position during the second cycle, thereby activating the relays 51, 52, the contacts of relay 51 are returned to their first stable state. In addition, relay contact 52a is again broken assuring that light source 38 remains de-energized. When the second developed print is ejected from slot 35, the switch 48 is restored to its normally closed position. Relays 51, 52 are de-energized and the contacts of relay 51 remain in their first stable state. Therefore, the superimposing apparatus is ready for the next two print-making cycles, initiated by depressing print switch 20a.

It is to be understood that variations in the structural detail of the above-described embodiment are possible and contemplated. For example, the above-described relay 51, 52 circuits can be replaced by electron device switching elements, such as diodes and transistors, in a bistable switching circuit designed to perform the same functions as those performed by the relay 51, 52 contact circuits. Furthermore, the frame 42, on which the legend film 40 and filter 41 are mounted, can be designed to move in a plane parallel to the plane of the print exposure area, for example, on a slide reciprocating between a storage position and a position intermediate the auxiliary light source 38 and the print exposure area 32.

Moreover, the means for moving the frame 41 can be a gear train coupling shaft 43 to a manually operated handle mounted on the machine 20 exterior. Furthermore, conventional magazine 22 need not be modified to initiate the two mode printing operation above described. In this case, switch 46, for enabling the machine 20 consecutively to make two prints of the same microfilm image, is located on the exterior of the machine 20 and is manually operated. In addition, the switch means 49 can be manually operated or can be automatically operated by an appropriate cam means actuated by the driver cam system. Moreover, such cam means can be used to replace the function of relay 51, 52 contacts 51b, 51d, 52b, that is, to assume that the auxiliary light source 38 is energized only when the superimposed legend is desired. In addition, the neutral density filter 41 can be replaced by an opaque plate fastened, for example, to frame 42. The opaque plate is shaped in such manner as to intercept light from source 26 that would otherwise be directed to the print exposure area 32 through the film legend 40.

It will also be appreciated that a plurality of legends having different additional information can be provided and arranged so as to be selectively moved into a position for projection onto a portion of the print exposure area. For example, a rotary shaft with a plurality of legends extending radially therefrom, could be selectively indexed to position desired supplemental information for projection onto the film image area of the exposure station. Likewise a separate film strip having a series of additional information images could be selectively positioned for similar projection of desired information thereon onto the image area of the exposure station.

The invention has been described with reference to a preferred embodiment thereof, but it will be understood that variations and modifications can be effected within the spirit and scope of the invention as described hereinabove and as defined in the appended claims.

We claim:

1. In a film reader-printer having means for projecting a film image, a screen for viewing said projected film image, an exposure station adapted for receiving photosensitive print material and means for selectively directing a film image projected by said projecting means either onto said viewing screen or onto said exposure station, the improvement comprising a means responsive to the selective direction of a projected film image onto said exposure station for projecting a supplemental information image onto a predetermined portion of the exposure station area towards which said film image is directed.

2. The invention defined in claim 1 wherein said supplemental information image projecting means comprises an illumination source separate from said film image projection means and a projectable information legend selectively movable into a position optically aligned with and between said separate illumination source and said predetermined portion of said exposure station area.

3. The invention defined in claim 2 wherein said information legend, when in said optically aligned position, is located in the projection path of film image and the light from said separate illumination source is of higher intensity than the light from said film image projecting means and further including at least one filter means selectively movable into the film image projection path in optical alignment with said information legend so as to prevent at least a portion of the light from said film image projecting means from passing to said exposure station but allowing sufficient of the light from said separate illumination source to pass therethrough to form an image of said information legend at said exposure station such as will be recorded on photosensitive material in said station.

4. In projection printing apparatus including a print exposure station adapted to receive light sensitive material, first projection means spaced from said print exposure station for projecting, upon actuation, a film images onto a predetermined area of said print exposure station, and means for actuating said first projection means, the improvement comprising:
 (a) second projection means, responsive to operation of said actuating means, for projecting a supplemental information image onto a lesser area within said predetermined area of said print exposure station;
 (b) means for filtering at least a portion of the light projected from said first projection means toward said lesser area, said filtering means being constructed to permit passage of sufficient light from said second projection means to form the supplemental information image; and
 (c) means for supporting said filtering means in a position optically aligned with and between said second projection means and said lesser area of said print exposure station.

5. The invention defined in claim 4 wherein said means for supporting said filtering means is movable between a first storage position and a second position optically aligned with and between said second projection means and said lesser area, and further including means for selectively positioning said supporting means in either of said first or second positions.

6. The invention defined in claim 4 wherein said second projection means includes:
 (a) an illumination source separate from said first projection means and adapted to project light of higher intensity than the light from said first projection means;
 (b) a projectable supplemental information image bearing medium; and
 (c) means for supporting said supplemental information image bearing medium in a position optically aligned with and between said separate illumination source and said lesser area.

7. The invention defined in claim 6 wherein said means for supporting said supplemental information image bearing medium is movable between a first storage position and a second position optically aligned with and between said separate illumination source and said lesser area, and further including means for selectively positioning said supporting means in either of said first or second positions.

8. The invention defined in claim 6 wherein said filtering means and said supplemental information image bearing medium are movable between a first storage position and a second position optically aligned with and between said separate illumination source, and further including control means for cyclically operating said actuating means to effect a plurality of sequential projections of the same film image onto said predetermined area and for inactivating said second projection means and moving said filtering means and said supplemental information image bearing medium to said first storage position so as to obtain at least one projection of the film image onto said predetermined area without projection of said supplemental information image onto said lesser area.

9. The invention defined in claim 6 wherein said supplemental information image bearing medium and said filter means are supported by the same supporting means.

10. The invention defined in claim 9 wherein said same supporting means is movable between a first storage position and a second position optically aligned with and between said separate illumination source and said lesser area, and further including means for selectively positioning said same supporting means in either of said first or second positions.

11. The invention defined in claim 4 further including means for controlling said actuating means to effect a plurality of sequential actuations of said first projection means and for inactivating said filtering means and said second projection means during at least one of said sequential actuations so as to obtain at least one projection of the film image onto said predetermined area without projection of said supplement information image onto said lesser area.

12. The invention defined in claim 11 further including means cooperating with said control means for selectively activating said control means to effect said sequential operation.

13. In a microfilm reader-printer of the type having a microfilm projecting means, a viewing screen spaced from said microfilm projecting means, an exposure station spaced from said microfilm projecting means and adapted to receive photosensitive material, and means for selectively directing an image projected from said microfilm projecting means to said viewing screen or said exposure station, the improvement comprising:

(a) means for substantially blocking a portion of a light image projected from said microfilm projecting means to said exposure station; and (b) means for projecting a supplemental image onto the portion of said exposure station that is blocked from light from said microfilm projecting means.

14. The invention defined in claim 13 wherein said supplemental image projecting means includes an illumination source and a light-projectable, image-bearing member.

15. The invention defined in claim 14 wherein said supplemental image projecting means is adapted to project light of higher intensity than the light of said microfilm projecting means and said light-blocking means includes a light filter which is adapted to absorb a major portion of light from said microfilm projecting means and which is adapted to allow passage of sufficient light from said supplemental image projecting means to record said supplemental image on photosensitive material located at said exposure station.

16. The invention defined in claim 15 wherein said light filter and said light projectable image-bearing member are selectively movable between a first position between said microfilm projecting means and said exposure station and a second position not between said microfilm projection means and said exposure station.

17. The invention defined in claim 16 further including means for selectively moving said light filter and said image-bearing member into said first position and for energizing said illumination source.

18. The invention defined in claim 17 further including control means for operating said microfilm projecting means to effect at least two successive projections onto said exposure station and for operating said supplemental image projecting means to effect projection of a supplemental image during at least one of said successive projections.

References Cited

UNITED STATES PATENTS

| 2,881,658 | 4/1959 | Bornemann | 355—43 X |
| 2,983,187 | 5/1961 | Bone | 355—42 X |
| 3,225,649 | 12/1965 | Timares et al. | 355—42 |
| 3,261,259 | 7/1966 | Baptie et al. | 355—42 X |
| 3,315,561 | 4/1967 | Boutigue | 355—42 |

NORTON ANSHER, Primary Examiner

R. A. WINTERCORN, Assistant Examiner

U.S. Cl. X.R.

355—45